(12) United States Patent
Iasi et al.

(10) Patent No.: US 10,298,556 B2
(45) Date of Patent: May 21, 2019

(54) SYSTEMS AND METHODS FOR SECURE STORAGE AND MANAGEMENT OF CREDENTIALS AND ENCRYPTION KEYS

(71) Applicant: FHOOSH, INC., La Jolla, CA (US)

(72) Inventors: Anthony Iasi, San Diego, CA (US); Gary Schneir, Carlsbad, CA (US); Charles Kahle, Escondido, CA (US); Linda Eigner, La Jolla, CA (US); William Eigner, La Jolla, CA (US); Eric Tobias, La Jolla, CA (US)

(73) Assignee: FHOOSH, INC., La Jolla, CA (US)

( * ) Notice: Subject to any disclaimer, the term of this patent is extended or adjusted under 35 U.S.C. 154(b) by 178 days.

(21) Appl. No.: 15/411,888

(22) Filed: Jan. 20, 2017

(65) Prior Publication Data

US 2017/0208050 A1    Jul. 20, 2017

Related U.S. Application Data

(60) Provisional application No. 62/281,097, filed on Jan. 20, 2016.

(51) Int. Cl.
*H04L 29/06* (2006.01)
*H04L 9/32* (2006.01)

(52) U.S. Cl.
CPC .......... *H04L 63/061* (2013.01); *H04L 9/3234* (2013.01); *H04L 63/083* (2013.01); *H04L 63/0876* (2013.01); *H04L 63/107* (2013.01)

(58) Field of Classification Search
CPC ... H04L 63/061; H04L 63/83; H04L 63/0876; H04L 9/3234; H04L 63/08; H04L 63/083;
(Continued)

(56) References Cited

U.S. PATENT DOCUMENTS 9,087,212 B2 * 7/2015 Balakrishnan ...... G06F 21/6227
9,455,963 B1 * 9/2016 Roth ................... H04L 63/0464
(Continued)

FOREIGN PATENT DOCUMENTS

KR    10-2011-0139798 A    12/2011
KR    10-2013-0108679 A    10/2013
(Continued)

OTHER PUBLICATIONS

International Search Report received in related International application No. PCTUS2017/014451, dated Apr. 17, 2017, 3 pages.
(Continued)

*Primary Examiner* — Ali S Abyaneh
(74) *Attorney, Agent, or Firm* — Procopio; Mark W. Catanese; Noel C. Gillespie

(57) ABSTRACT

A system for storing and managing credentials and encryption keys includes a first data store, a second data store, a client device, and a secure key platform. The client device is configured to transmit a request to retrieve user data stored in the first data store. The secure key platform configured to: store user credentials and data store credentials in the second data store separate from the user data stored in the first data store; receive a request to retrieve user data; retrieve, from the second data store, user credentials of a user of the client device and data store credentials of the first data store in response to the request; use the user credentials of the user of the client device and data store credentials of the first data store to retrieve user data from the first data store; and provide the user data to the client device.

16 Claims, 4 Drawing Sheets

(58) Field of Classification Search
CPC . H04L 9/08; H04L 63/0428; H04L 29/06551; G06F 21/6218; G06F 21/10
See application file for complete search history.

(56) References Cited

U.S. PATENT DOCUMENTS

| | | | |
|---|---|---|---|
| 9,590,989 B2* | 3/2017 | Spagnola | H04L 63/0428 |
| 2012/0066223 A1 | 3/2012 | Schentrup et al. | |
| 2012/0227096 A1* | 9/2012 | Edwards | H04L 9/0827 726/7 |
| 2014/0331060 A1* | 11/2014 | Hayton | G06F 21/31 713/186 |
| 2015/0371052 A1* | 12/2015 | Lepeshenkov | H04L 63/06 713/165 |
| 2016/0211976 A1* | 7/2016 | Paris | H04L 63/1458 |

FOREIGN PATENT DOCUMENTS

| | | | |
|---|---|---|---|
| KR | 10-1520722 A | 5/2015 | |
| WO | 2007-085824 A1 | 8/2007 | |

OTHER PUBLICATIONS

International Preliminary Report on Patentability for related International application No. PCT/US2017/014451, dated Aug. 2, 2018, 7 pages.

* cited by examiner

SYSTEMS AND METHODS FOR SECURE STORAGE AND MANAGEMENT OF CREDENTIALS AND ENCRYPTION KEYS

CROSS-REFERENCE TO RELATED APPLICATIONS

This application claims priority to U.S. Provisional Patent App. No. 62/281,097, filed on Jan. 20, 2016, the disclosure of which is incorporated herein in its entirety by reference.

BACKGROUND

Technical Field

Various embodiments described herein relate generally to the field of electronic data security and more particularly to the secure storage and management of credentials and encryption keys.

Related Art

In order for a user to be able to store and retrieve data, there must be a way to identify that user and protect their data from being accessed by any other user. Traditionally, this is performed by "front-end" software where the user is authenticated and authorized through a login process.

The conventional login process is associated with a number of documented weaknesses. For example, in many systems, the login step is commonly considered a part of the user interface (UI) and a separate entity from the security bubble. The problem is magnified in cases where in-house developers, having limited background in security, attempt to build custom login authentication and authorization systems. As such, a malicious user can potentially have access to other users' data once that user is successfully completes the login process.

Thus, what is needed is a system and method for secure storage and management of credentials and encryption keys.

SUMMARY

Systems and methods for secure storage and management of credentials and encryption keys are disclosed.

According to some embodiments, there is provided a system for storing and managing credentials and encryption keys. The system may include a first data store, a second data store, a client device, and a secure key platform.

The client device may be configured to transmit a request to retrieve user data stored in the first data store. The secure key platform may be configured to: store user credentials and data store credentials in the second data store separate from the user data stored in the first data store; receive, from the client device, the request to retrieve user data stored in the first data store; retrieve, from the second data store, user credentials associated with a user of the client device and data store credentials associated with the first data store in response to the request to retrieve user data; use the user credentials of the user of the client device and data store credentials of the first data store to retrieve user data from the first data store; and provide the user data to the client device.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

The various embodiments mentioned above are described in further detail with reference to the aforementioned figured and the following detailed description of exemplary embodiments.

DETAILED DESCRIPTION

Certain embodiments disclosed herein provide methods and systems for secure storage and management of credentials and encryption keys. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
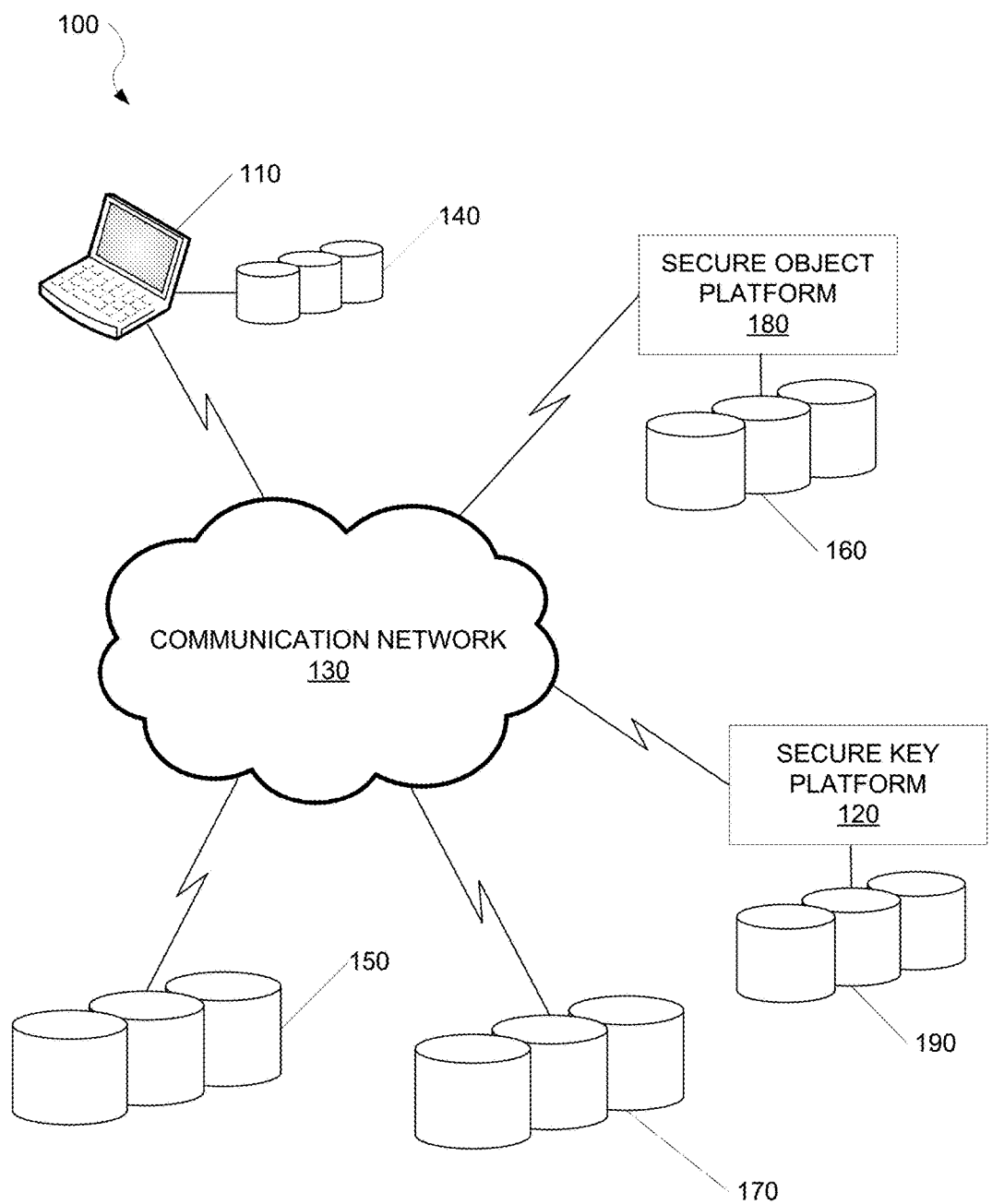
FIG. 1 is a network diagram illustrating a network environment according to various embodiments.

FIG. 1 is a network diagram illustrating a network environment 100 according to various embodiments. Referring to FIG. 1, in various embodiments, a client device 110 communicates with a secure key platform 120. The client device 110 can be any device that is capable of communication with or causing communication with the secure key platform 120 through a wired or a wireless connection. For example, the client device 110 may be a wired or wireless communication device including, for example, but not limited to, a smartphone, a wearable device, a tablet personal computer (PC), a laptop, a desktop PC, a personal entertainment system, and an embedded processing system.

The client device 110 may communicate with the secure key platform 120 via a communication network 130. In various embodiments, the communication network 130 represents one or more wired and/or wireless connections. For example, the communication network 130 may include, for example, but not limited to, a wired and/or wireless local area network (LAN), a wired and/or wireless wide area network (WAN), and any combinations thereof.

One or more features and functionalities of the secure key platform 120 may be accessed on the client device 110 via a mobile and/or web application. For example, the secure key platform 120 may register the client device 110 when the client device 110 connects to the secure key platform 120 for the first time. To register the client device 110, the secure key platform 120 may validate and record a device signature including, for example, but not limited to, a browser type, plugins, hardware settings, and geolocation.

In some embodiments, one or more challenge questions may be posed during device registration and the responses may be stored. To authenticate the client device 110, the secure key platform 120 may require correct responses to one or more challenge questions in addition to a username, password, and passphrase.

In one exemplary embodiment, the secure key platform 120 may implement multifactor authentication. For example, a user may be required to provide a personal phone number during device registration for the client device 110. When the user attempts to connect to the secure key platform 120 from a different client device, a unique code may be transmitted to the client device 110 (e.g., via short message service (SMS)). The user may be required to provide that unique code from the new client device in order to register the new client device.

In some embodiments, the client device 110 may be associated with a user who is an administrator. As such, the secure key platform 120 may authenticate the client device 110 further based on the internet protocol (IP) address from which the client device 110 is attempting a login. For example, in the event that an administrator login is attempted from outside of an authorized IP address range, the secure key platform 120 may deploy one or more measures including, for example, but not limited to, disabling the administrator account and transmitting alerts to one or more verified email accounts.

In various embodiments, the secure key platform 120 stores and manages user credentials associated with the client device 110 including, for example, but not limited to, usernames, passwords, passphrases, and challenge questions and/or responses. The user credentials are used to access user data. In some embodiments, a secure object platform 180 may decompose the user data into a plurality of segments and store the segments across multiple data stores including, for example, but not limited to, a first data store 140, a second data store 150, and a third data store 160.

In various embodiments, the secure key platform 120 may also store and manage data store credentials. As such, the secure key platform 120 may store and manage user credentials as well as data store credentials for the first data store 140, the second data store 150, and the third data store 160. Data store credentials may be data store (e.g., hardware) specific. For example, access to data stored using Amazon® Simple Storage Service (S3) requires both an access key id and a secret key (shown below).

[default]
aws_access_key_id=AKISI4GYe272VMSDHMXA
aws_secret_access_key=+SSpaVFQVRG/
SlfgnZ4L5dUkPtqbSG0eZ51Q/W In various embodiments, the secure key platform 120 decomposes the user credentials and/or the data store credentials into a plurality of segments and stores the segments across multiple data stores. According to one exemplary embodiment, user data is stored and managed separately from user credentials and data store credentials. As such, the secure key platform 120 may store the segments of the user credentials and/or data store credentials in data stores separate from the user data including, for example, but not limited to, a fourth data store 170 and a fifth data store 190.

In various embodiments, segments of user data, user credentials, and data store credentials may be stored in local and/or remote data stores. For example, the first data store 140 may be a local data store with respect to the client device 110 including, for example, but not limited to, an internal hard drive, a portal storage device (e.g., a universal serial bus (USB) flash drive, external hard drive), and any combination thereof. The second data store 150, the third data store 160, the fourth data store 170, and the fifth data store 190 may be each be a remote data store (i.e., with respect to the client device 110) including, for example, but not limited to, one or more databases (e.g., MongoDB®), cloud storage, and any combination thereof. The second data store 150, the third data store 160, the fourth data store 170, and the fifth data store 190 can each be a proprietary data store (i.e., directly associated with the secure key platform 120 and/or the secure object platform 180), or be associated with one or more third-party file hosting services (e.g., Amazon® S3, Dropbox®) and/or storage as a service (STaaS) providers.

Storage and retrieval of user data that is decomposed into a plurality of segments and distributed across multiple storage locations are further described in U.S. patent application Ser. No. 14/863,294, the disclosure of which is incorporated herein by reference in its entirety. In some embodiments, user data may be retrieved in a diffracted manner from multiple storage locations. Diffracted data retrieval is described in U.S. patent application Ser. No. 14/970,466, the disclosure of which is incorporated herein by reference in its entirety.

In various embodiments, user credentials and data store credentials are required to access user data. The client device 110 may connect to the secure key platform 120 and retrieve user data via the secure key platform 120. For example, a user may transmit one or more requests to retrieve user data by inputting, selecting, or otherwise invoking a getData( ) command through the UI provided via the client device 110. It is to be understood that references to user data throughout the present disclosure extends to any metadata that is associated with the user data. As such, any operation that is performed with respect to the user data (e.g., retrieving the user data) may performed with respect to the user data and/or metadata associated with the user data.

The secure key platform 120 is configured to authenticate the client device 110 and to process the user's request to access user data. For instance, the secure key platform 120 may authenticate the client device 110 based on the device signature as well as the username and password provided by the user. The secure key platform 120 may establish a secure session with the client device 110 upon successful authentication of the client device 110.

The secure key platform 120 is further configured to process the request to retrieve user data. For example, the secure key platform 120 may retrieve user data by communicating the request to the secure object platform 180 (e.g., via the communication network 130). In various embodiments, the secure key platform 120 may receive the requested user data from the secure object platform 180 and provide the user data to the client device 110. However, it is to be understood that the secure key platform 120 is compatible with a different and/or additional data storage systems or schemes without departing from the scope of the present disclosure.

According to one exemplary embodiment, user data is encrypted using a user passphrase prior to being stored (e.g., by the secure object platform 180 across multiple data stores). The user passphrase (e.g., a secret phrase or sentence) may be unique to each individual user. It may be virtually impossible to decrypt user data absent a correct user passphrase. As such, in order to retrieve user data in response to the request, the secure key platform 120 may provide the user's passphrase to the secure object platform 180 along with the request to retrieve user data. It is to be understood that secure key platform 120 may support additional levels of encryption (e.g., private and public key encryption) for the user data without departing from the scope of the present disclosure.

In some embodiments, the user's passphrase may be required to access a lockbox containing an additional passphrase required to gain access to (e.g., decrypt) the user data. It is to be understood that user data may be encrypted using multiple passphrases contained in a sequentially locked series of lockboxes. For example, a first passphrase may be required to unlock a first lockbox containing a second passphrase while the second passphrase is required to unlock a second lockbox containing a third passphrase.

In some embodiments, the secure key platform 120 does not store the user's passphrase thereby requiring the user to provide the passphrase in order to gain access (e.g., decrypt) the user data. Alternately, in some embodiments, the secure key platform 120 may store the user's passphrase and may provide the user's passphrase automatically or upon request (e.g., lost user passphrase, change user passphrase). For example, in some embodiments, the secure key platform 120 may decompose the user's passphrase into a plurality of segments and store the segments across multiple data stores separate from the user data including, for example, but not limited to, the fourth data store 170 and the fifth data store 190.

In some embodiments, the secure key platform 120 may additionally require a system passphrase in order to access the features and functionalities provided by the secure key platform 120. For example, in addition to the user passphrase, the secure key platform 120 may require a system passphrase in order for a user to gain access to user data. The system passphrase may be disabled when a user fails to pay an access key and/or violates the terms of service.

In various embodiments, the secure key platform 120 can be configured to store redundant copies of user credentials and/or data store credentials. The redundant copies of user credentials and/or data store credentials are also stored separately from user data. As user credentials and data store credentials tend to be more compact than user data, full backup and recovery cycles can be performed quicker with minimal business disruption.

Although the network environment 100 is shown to include the first data store 140, the second data store 150, the third data store 160, the fourth data store 170, and the fifth data store 190, a person having ordinary skill in the art can appreciate that segments of user data, user credentials, and data store credentials may be stored in any number of data stores without departing from the scope of the present inventive concept. For example, the number of storage locations used to store segments of the data object may vary based on one or more factors including, for example, but not limited to, a size, complexity, and number of segments associated with the user data, user credentials, and data store credentials.

Figure 2:
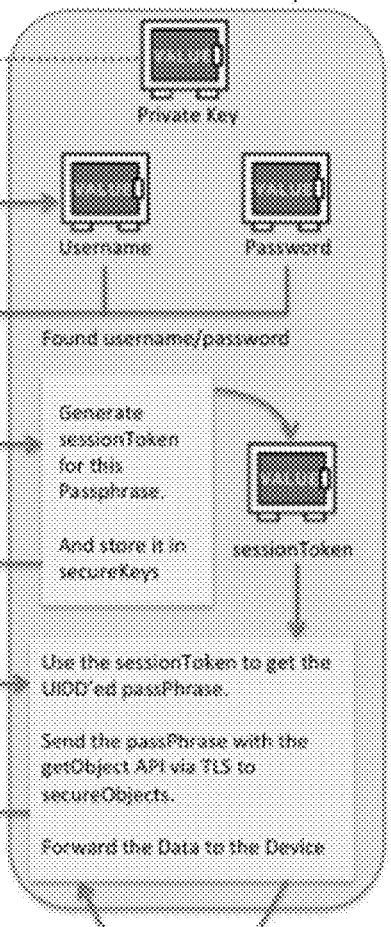
FIG. 2 illustrates a process for retrieving user data according to various embodiments.

FIG. 2 illustrates a process 200 for retrieving user data according to various embodiments. Referring to FIGS. 1-2, the process 200 can be performed by the secure key platform 120.

Figure 3:
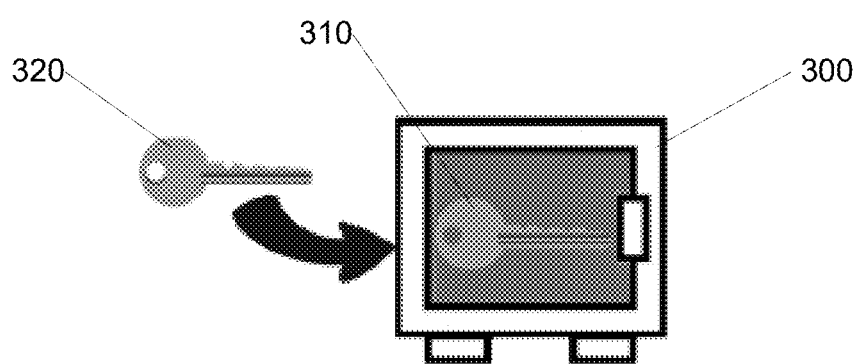
FIG. 3 illustrates lockbox key isolation according to various embodiments.

FIG. 3 illustrates lockbox key isolation according to various embodiments. Referring to FIGS. 1-3, the secure key platform 120 may be configured to implement lockbox key isolation. According to one exemplary embodiment, a first key 310 (e.g., a user's passphrase) can be isolated in a lockbox 300. Access to the first key 310 may be obtained by unlocking the lockbox 300 using a second key 320. In various embodiments, the first key 310 may be used to access user data. As such, access to user data may be changed or removed by changing the first key 310 or removing the first key 310 from the lockbox 300.

In some embodiments, the first key 310 may be a common key such that more than one user have (or have access to) the second key 320. As such, multiple users may use the second key 320 to unlock the lockbox 300 thereby gaining access to the first key 310 and data protected (e.g., encrypted) using the first key 310.

Various aspects of the present disclosure may protect user credentials based on the type of user and the user's scope of access. For example, certain users (e.g., a "Compound User") must have another user authorize their access in real time. Other users are restricted to access a subset of data controlled by another user.

User Types and Roles

In various embodiments, the secure key platform 120 may control access to user credentials, data store credentials, and user data based on each user's type and/or role.

Primary User

A primary user is identified as the person who has the highest level of ownership to the data associated with a corresponding user name within various data store. This user is considered as the "main" user and requires account information such as a username and password to gain access. The primary user has account administrative access by default and may grant administrative access to other users. All other users are regarded as "associate" users.

Associate User

An associate user has subordinate access to the data associated with a primary user's username. There are several classifications of associate users, each having a specific access level. There may be multiple instances of any combination of different classifications of associate users. For example, it is possible to have three alternate users and two delegate users. The primary user is responsible for approving each new instance of an associate user. An associate user is required to provide a user name, password, and primary user name in order to gain access.

Alternate Associate User

An alternate associate user is a "twin" to the primary user in that the alternate associate user has access to all data associated with the primary user's account. As such, an alternate associate user is able to perform any operation (e.g., put( ) get( )) on the data associated with the primary user's account. By default, an alternate associate user does not have administrator access although such access may be granted access by the primary user.

Compound Associate User

A compound associate user must have another user authorize access in real time. For example, as the compound associate user logs in, another window will request that a second user (either a primary user and/or an alternate associate user) log in and grant access to the compound associate user. Once access is granted, the compound associate user may have access to all data. A compound associate user may have an access time limit assigned by the primary user. Access by a compound associate user may be further limited by designating the compound associate user as a restricted user.

Delegate Associate User

A delegate associate user has the same access levels as an alternate associate user. In addition, a delegate associate user has administrator access by default. A system administrator may use this user account type to gain access to user data.

Restricted Associate User

A restricted associate user has no access to data by default. Instead, the restricted associate user may have access to specific data objects as identified by a primary user (e.g., through the primary user's administrator page). For example, the primary user may associate certain data objects with a restricted associate user account thereby providing the restricted associated user with access to only those data objects.

Use Case

Consider an information technology (IT) support organization where IT support employees are entrusted with the login credentials of multiple data stores, servers, or other infrastructure equipment associated with a plurality of customers. Typically, every IT employee is given a list of data store credentials that are required for logging into one or more data stores. Those data stores may be at customer sites where physical access is provided or through virtual connections. Each employee might use various ad-hoc methods to record the data store credentials ranging from post-it notes to online notes stored on an online service-ticketing program. As the IT employee travels from customer site to customer site, those records are easily misplaced or left behind for all to see. This very common use-case presents a number of security concerns:

1) Non-standard management of data store credentials leads to credentials being carelessly exposed. It is not uncommon that they are written on post-it notes or scratch paper, recorded on the employee's personal devices, stored in log files, or transmitted across non-secure channels such as chat apps or emails.

2) Poor control over limiting credentials to only the IT employees who are actually responsible for servicing a specific data store. Job ticketing software is very common in service organizations and frequently the entire service department has access to the service ticket. If the equipment's credentials are recorded in the ticket, it is exposed to the entire staff.

3) Risk of retribution from fired IT support employees. System credentials may easily remain in the possession of the ex-employee in the form of written notes, personal communications, or employee-owned devices. If an IT support organization is managing hundreds or thousands of data stores, servers, and other infrastructure equipment across multiple customers, it becomes nearly impossible to protect every device from the former employee. It is very time consuming and disruptive to change the credentials on each exposed system whenever an employee is let go.

In various embodiments, the secure key platform 120 is configured to address the foregoing problems:

1) Data store credentials are centrally managed in a manner that encrypts and protects data as sensitive as data store credentials are. The secure key platform 120 allows only authorized IT Support staff and supervisors to access these credentials in a need-to-know basis.

2) Regarding need-to-know, the secure key platform 120 provides supervisors with the ability to assign specific data store credentials to specific IT personnel who are authorized to work on that data store. Other IT staff will not know what those credentials are unless they are assigned to work on the data store. The secure key platform 120 provides the ability for supervisors to grant certain IT staff members the ability to assign credentials. For example, a supervisor may entrust a senior IT staff member with "assignment rights". That senior staff member would be able to assign other IT staff members with specific data store credentials.

3) The secure key platform 120 can revoke access for fired or reassigned IT staff members. Since all data store credentials are password protected, former employees are not able to gain access using the set of credentials they were originally assigned. As an additional security feature, the secure key platform 120 supports active key rotation that internally protects stored credentials from hackers who attempt to use old keys. Another level of security comes from the fact that data store credentials no longer need to be fixed over time. Since the data store credentials are displayed upon request by authorized staff members, they can be dynamic much like any other stored data would be. The secure key platform 120 is able to rotate data store credentials as frequently as necessary (e.g., every minute). For instance, an IT staff member could call up the data store credentials, log into that data store, log out, and subsequently call up the data store credentials this time displaying a completely different login password. The IT staff member only needs to enter the password currently displayed, which is valid at that point in time.

Figure 4:
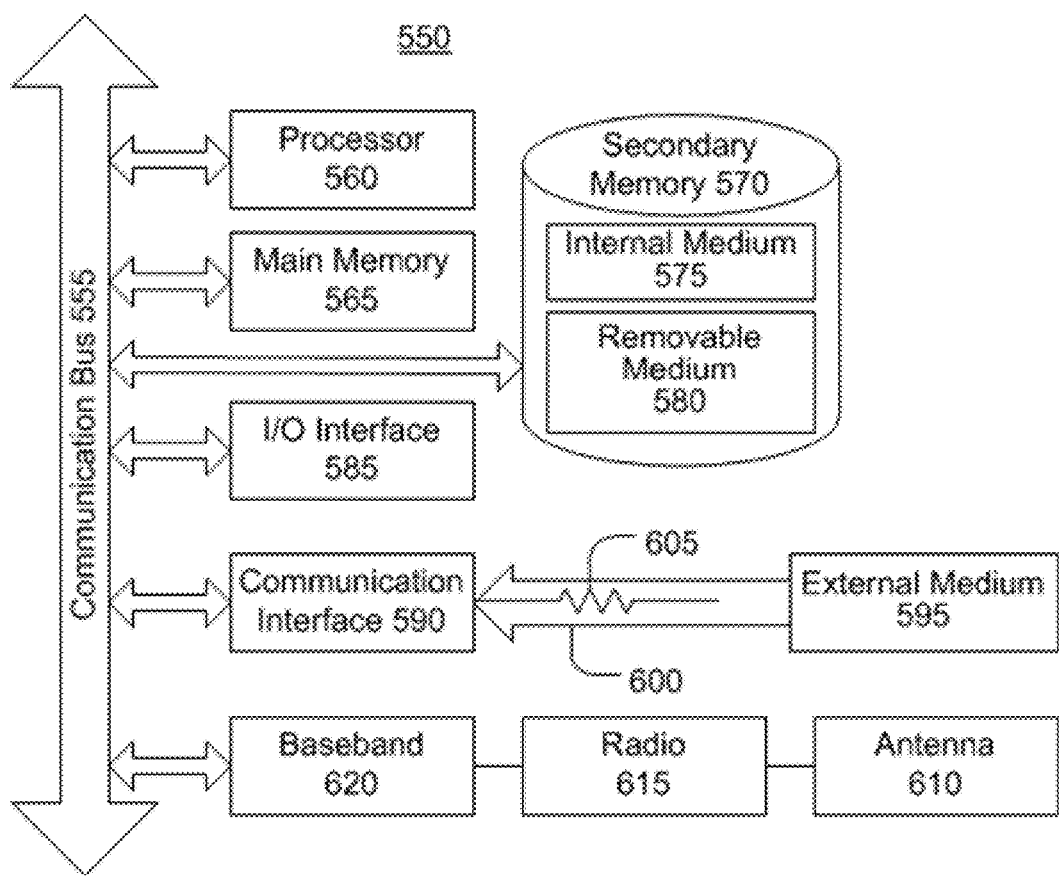
FIG. 4 is a block diagram illustrating wired or wireless system according to various embodiments.

FIG. 4 is a block diagram illustrating wired or wireless system 550 according to various embodiments. Referring to FIG. 1, the system 550 may be used to implement the client device 110, the secure key platform 120, and/or the secure object platform 180.

In various embodiments, the system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable storage medium 580, for example a floppy disk drive, a magnetic tape drive, a compact disc ("CD") drive, a digital versatile disc ("DVD") drive, etc. The removable storage medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, the secondary memory 570 may include other similar means for allowing computer programs or other data or instructions to be loaded into the system 550. Such means may include, for example, an external storage medium 595 and a communication interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 580 and a communication interface, which allow software and data to be transferred from an external storage medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. The electrical communication signals 605 are preferably provided to communication interface 590 via a communication channel 600. In one embodiment, the communication channel 600 may be a wired or wireless network, or any variety of other communication links. Communication channel 600 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable storage medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable storage medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The processor 560 has access to one or more data storage areas including, for example, but not limited to, the main memory 565 and the secondary memory 570. The processor 560 is preferably configured to execute instructions (i.e., computer programs or software) that can be stored in the main memory 565 or in the secondary memory 570. Computer programs can also be received from the baseband processor 610 and stored in the main memory 565 or in the secondary memory 570, or executed upon receipt. Such computer programs, when executed, enable the system 550 to perform the various functions of the present invention as previously described. For example, the main memory 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for storing and managing credentials and encryption keys, comprising:
   a first data store and a second data store;
   a client device configured to transmit a request to retrieve user data stored in the first data store;
   a secure key platform configured to:
      store, in the second data store, device signatures for a plurality of devices including the client device, user credentials for a plurality of users, and data store credentials associated with a plurality of data stores including the first data store, the second data store separate from the user data stored in the first data store;
      authenticate access to the secure key platform by the client device based on a device signature of the client device;
      receive, from the client device, the request to retrieve user data stored in the first data store;
      retrieve, from the second data store, user credentials associated with a user of the client device of the plurality of users in response to successfully authenticating the client device;
      retrieve data store credentials associated with the first data store using the user credentials, the first data store credentials associated with the user credentials in the second data store based on the first data store credential being assigned to the user;
      use the data store credentials of the first data store to retrieve the requested user data from the first data store; and
      provide the user data to the client device.

2. The system of claim 1, wherein the secure key platform is further configured to register the client device including by validating and recording the device signature, the device signature including one or more of a browser type, plugins, hardware settings, and geolocation.

3. The system of claim 2, wherein the secure key platform is further configured to register the client device by posing one or more challenge questions, and storing responses to the one or more challenge questions.

4. The system of claim 1, wherein the client device is further configured to attempt to log into the secure key platform.

5. The system of claim 1, wherein the secure key platform is configured to automatically retrieve the user credentials in response to successfully authenticating the client device.

6. The system of claim 1, wherein the secure key platform is configured to authenticate the client device based on one or more of a username provided by the user, a password provided by the user, a response to at least one challenge question provided by the user, a browser type of the client device, plugins of the client device, hardware settings of the client device, a geolocation of the client device, and an internet protocol (IP) address from which the client device is attempting the login.

7. The system of claim 1, wherein the user credentials comprise a first passphrase.

8. The system of claim 7, wherein the user data stored in the first data store is encrypted using the first passphrase.

9. The system of claim 7, wherein the first passphrase controls access to a second passphrase, and wherein the user data stored in the first data store is encrypted using the second passphrase.

10. The system of claim 1, wherein the first data store comprises a first subset of the plurality of data stores, the system further comprising a secure object platform configured to:
    decompose the user data into a plurality of segments; and
    store the plurality of segments of the decomposed user data across jiallthe first subset of the plurality of data stores including the first data store.

11. The system of claim 10, wherein the secure object platform is further configured to retrieve data store credentials associated with each of the first subset of the plurality of data stores using the user credentials.

12. The system of claim 1, wherein the user credentials associated with the user of the client device of the plurality of users are used to retrieve only data store credentials for accessing a first subset of the plurality of data stores including the first data store and are restricted from retrieving data credentials for accessing a second subset of the plurality of data stores.

13. The system of claim 1, wherein the client device comprises an encrypted private key based on registering the client device with the secure key platform, and wherein the secure key platform is configured to:
    in response to successfully authenticating the client device, establish a secure connection with the client device by generating a session token that is stored in the second date store and transmitted to the client device; and
    using the session token to retrieve the first data store credentials.

14. The system of claim 13, wherein the secure key platform is further configured to transmit the first data store credentials with the request to retrieve user data stored in the first data store to the first data store.

15. The system of claim 13, wherein the first data store credentials comprise a second passphrase.

16. The system of claim 13, wherein the secure key platform is further configured to store a public key of the client device based on registering the client device with the secure key platform, wherein the user data provided to the client device is encrypted using a public key associated with the client device, and the client device is configured to decrypt the provided user data using a private key of the client device.

* * * * *